Figure 1:
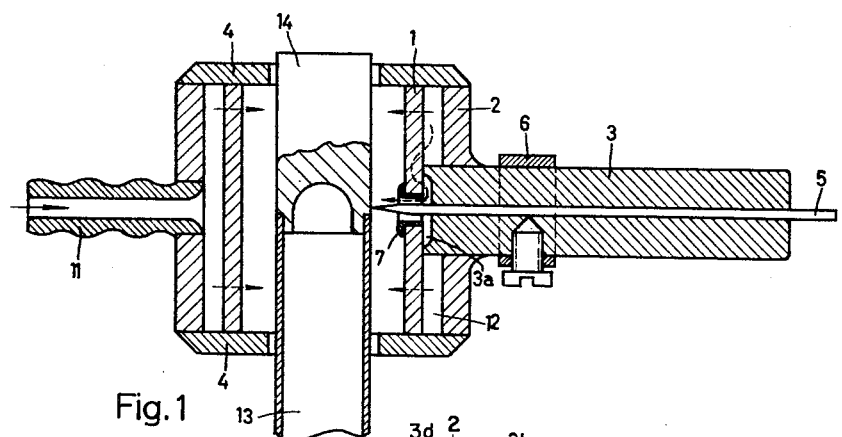

Dec. 11, 1962 W. RÖSSNER 3,068,343
ARC WELDING DEVICE FOR ROD OR TUBE MATERIAL
Filed April 18, 1960

United States Patent Office 3,068,343
Patented Dec. 11, 1962

3,068,343
ARC WELDING DEVICE FOR ROD OR TUBE MATERIAL
Wolfgang Rössner, Nurnberg, Germany, assignor to Siemens-Schuckertwerke Aktiengesellschaft, Berlin-Siemensstadt, Germany, a corporation of Germany
Filed Apr. 18, 1960, Ser. No. 22,982
Claims priority, application Germany Apr. 18, 1959
14 Claims. (Cl. 219—69)

My invention relates to devices for welding rod-shaped material in a protective gas atmosphere.

When welding oxidizable or corrodible material, it is often necessary to keep atmospheric oxygen away from the welding location. This can be done either by means of solid or liquid substances, such as welding powder, or by employing a protective gas atmosphere. For welding high-quality materials, such as used particularly for the sleeves of nuclear fuel elements, only protective-gas methods, such as the argon-arc method, are suitable.

Since the noble gas for such protective purposes is expensive, particularly if especially purified, it must be used most economically. This is preferably done by having the protective gas displace the air in whirlfree flow away from the material being welded.

It is known for this purpose to surround the welding location by a tubular body whose wall is hollow and from whose interior, porous surface the protective gas flows uniformly onto the welding location. The porous wall of such tubular bodies, as heretofore used for the argon-arc method, has a relatively larger opening through which a special welding electrode can be moved toward the workpiece, and an additional gas supply is provided for enveloping the electrode in a gas shield. This entails an increased gas consumption and partially obviates the mainly desired advantages of the cylindrical porous body. In addition, a detrimental disturbance of the gas flow is encountered. For these reasons, such devices do not readily lend themselves to the processing of difficult-to-weld materials such as zirconium, titanium and similar products.

My invention overcomes these disadvantages by an improved design of the welding device, particularly of the components involved in gas supply and electrode guidance.

It is a broad object of my invention to design an arc welding device for rod or tube material that affords a reduced protective-gas consumption and a smooth, whirlfree gas flow.

Another object of my invention is to provide improved means for supplying gas to the welding space proper and simultaneously along the welding electrode, thus eliminating the need for cooling by means of an additional gas supply.

According to my invention, a tubular body through which the material to be welded may pass, has a porous cylindrical wall through which a protective gas is supplied to the interior space from a single lateral gas supply, and the porous wall has a lateral opening through which a welding electrode can pass in a direction transverse to the axis of the tubular body toward the rod or tube material to be welded, the lateral opening being slightly larger than the diameter of the welding electrode so as to form an annular gap through which some of the protective gas can flow along and around the electrode from the above-mentioned gas supply to the interior welding space or to the outside, thus forming a gas shield and coolant without requiring a second gas source or gas supply line.

Figure 2:
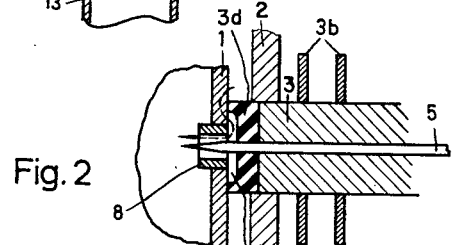
Figure 3:
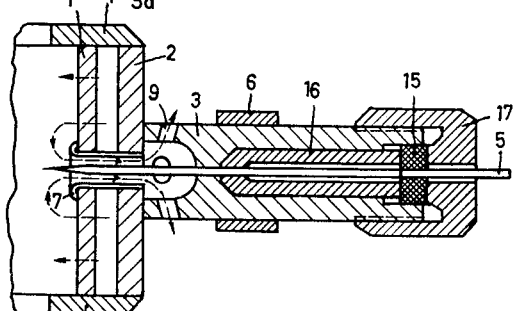
Figure 4:
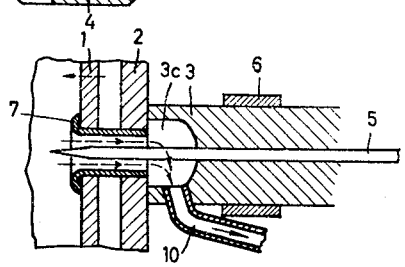

Further objects and specific features of my invention will become aparent from the following description of several embodiments shown, by way of examples, on the accompanying drawings of which FIG. 1 is a sectional view of a complete welding device;
FIG. 2 shows in section a detail of a modified device; and
FIGS. 3 and 4 show two further modifications respectively, also in section.

The same reference characters are used for similar respective components in all illustrations.

According to FIG. 1, two workpieces 13 and 14 are to be welded together at their junction by turning them about their common axis, in front of the tip of a welding electrode 5, the welding being effected by means of an arc burning between the welding electrode 5 and the workpiece assembly. The welding electrode is guided in a metallic piece 3 which, if desired, may be cooled by air or water. Current is supplied through a terminal clamp 6 and an appertaining fastening screw. Rigidly connected with the guiding piece 3 is a tubular structure comprising an inner porous cylinder 1, an outer dense jacket 2, two ring-shaped cover plates 4, and a lateral nipple for attachment of a gas supply hose. The porous cylinder, by virtue of its construction possesses a plurality of heteromorphous, irregular and promiscuously directed gas passages. The openings of covers 4 for the passage of the workpieces may have the same diameter as the opening of cylinder 1. However, it is preferable to make the openings in the covers 4 somewhat smaller for better retaining the protective gas in the inner space after it has penetrated through the porous cylinder, and also for the purpose of using the cover openings for guiding the workpiece.

The welding electrode passes from guide part 3 through a relatively narrow lateral bore in cylinder 1. The bore is lined with a sleeve 7. The protective gas enters through nipple 11 into the inner space 12 of the protective-gas distributor and then flows through the fine pores of cylinder 1 against the workpiece, thus displacing without turbulence the air originally located near the workpiece. When, after thorough scavenging, any oxygen residues are eliminated, the welding arc is ignited between the welding electrode 5, and the workpiece 13, 14 is welded on its entire periphery by turning the workpiece about its axis.

During the welding the electrode becomes intensively heated. This makes it necessary to additionally cool the electrode for prolonged welding operation. This is done by using the protective gas itself as a coolant. According to FIG. 1, the guide piece 3 has a recess 3a so that some of the protective gas passes from the hollow space 12 into the recess 3a of the guide piece 3 and then travels along the electrode 5 to the welding space proper.

A similar cooling device, including the recess 3a is used in the modified embodiment shown in FIG. 2, except that the guide piece 3 is equipped with exterior cooling vanes 3b exposed to the ambient air.

In the embodiment of FIG. 3 the cooling is effected by a reversed gas current which passes through bores 9 of the guide piece 3 into the ambient air.

The flow velocity along the electrode can be increased according to FIG. 4 by providing for additional removal of the protective gas by suction from the recessed space 3c of the guide piece 3. Such sucking action can be effected, for example, by the supplied protective gas itself on the principle of a water-jet pump.

In the embodiments according to FIGS. 3 and 4, the gas quantity used for cooling the electrode passes from the welding space through the lining 7 of the bore in the porous cylinder 1. Hence the gas used for cooling is heated by the welding operation. In cases when such cooling is not sufficient for continuous operation, it is preferable to directly cool the guide piece by an additional supply of air or water, thus indirectly cooling the welding electrode. If desired, the welding electrode may also be cooled directly in this manner.

In welding devices of very small diameter, the arc may temporarily jump from the workpiece onto the porous cylinder 1 which may consist, for example, of a metallic sintered material. The arc then temporarily leaves the electrode and may cause burning at the porous wall. This can be prevented by inserting, according to FIG. 2, an exchangeable ceramic bushing 8 in lieu of the steel bushing 7 into the lateral bore of the cylinder 1.

Such jumping of the arc can also be avoided by passing the welding electrode through the protective-gas chamber inside of an insulating bushing, and insulating the protective-gas chamber from the welding transformer. For the purpose of such insulation, the device shown in FIG. 2 is provided with an end portion 3d of ceramic or other electrically insulating and heat resistant material. For the same purpose the metallic porous cylinder 1 may be substituted by a cylinder of ceramic material.

In special cases, it may be necessary to introduce the welding electrode 5 through a gas-tight seal where it passes through the guide piece 3. According to FIG. 3, this is done by means of a rubber washer 15 which is pressed by a cap nut 17 against a clamping member 16. The rubber washer 15 is thus pressed against the guide piece 3 and against the electrode 5 to provide the desired seal.

It will be obvious to those skilled in the art, upon studying this disclosure, that arc welding devices according to my invention can be given a variety of embodiments and hence may have a design other than particularly illustrated and described herein, without departing from the essential features of my invention and within the scope of the claims annexed hereto.

I claim:

1. An arc welding device for rod or tube material, comprising a tubular structure forming a welding space to be coaxially traversed by the material to be welded, said tubular structure having a porous wall completely surrounding said welding space, said wall having a lateral opening for the passage of a welding electrode of smaller cross-section than said opening, gas conduit means joined with said tubular structure at the exterior side of said porous wall for supplying protective gas through said porous wall to said welding space, electrode holder means joined with said tubular structure, said electrode holder means having an electrode passage defining an electrode axis passing through said opening in a direction transverse to the axis of said tubular structure, the welding electrode when passing through said opening forming together therewith an annular gas passage, said holder means having a cavity forming a gas chamber wholly on the exterior side of said wall, said gas chamber being adjacent to and communicating with said opening so as to form a gas flow path from said conduit means through said opening and said chamber for cooling the electrode.

2. An arc welding device for rod or tube material, comprising a tubular structure forming an interior welding space to be coaxially traversed by the material to be welded, said tubular structure having a gas-permeable, porous tubular wall coaxially positioned around said welding space and having a gas-impermeable tubular packet concentrically surrounding said porous wall and forming together therewith an annular interspace, said porous wall having a lateral opening for the passage of a welding electrode of smaller cross-section than said opening, gas conduit means joined with said jacket and communicating with said interspace for supplying it with protective gas to pass through said porous wall into said welding space, and electrode holder means joined with said tubular structure, said electrode holder means having an electrode passage defining an electrode axis passing through said opening in a direction transverse to the axis of said tubular structure whereby the welding electrode when passing through said opening forms together therewith an annular gas passage, said electrode holder means being bare of connection to said gas conduit means.

3. In an arc welding device according to claim 2, said holder means having a cavity forming a gas chamber adjacent to, and communicating with, said opening so as to form a gas flow path from said conduit means through said opening and said chamber for cooling the electrode, and a gas-impermeable lining in said opening, said lining forming a communication directly between said chamber and said welding space.

4. In an arc welding device according to claim 2, said holder means having a cavity forming a gas chamber adjacent to, and communicating with, said opening so as to form a gas flow path from said conduit means through said opening and said chamber for cooling the electrode, and a sleeve of heat resistant and electrically insulating material forming a lining in said opening and protruding from said porous wall into said welding space.

5. In an arc welding device according to claim 1, said electrode holder means substantially consisting of electrically conducting metal and being electrically insulated from said porous wall of said tubular structure.

6. In an arc welding device according to claim 2, said porous wall consisting of heat resistant and electrically insulating material.

7. In an arc welding device for rod or tube material, comprising a tubular structure forming a welding space to be coaxially traversed by the material to be welded, said tubular structure having a porous gas-permeable wall around said welding space and having a gas-impermeable tubular jacket surrounding said porous wall and forming together therewith an interspace, said porous wall having a lateral opening for the passage of a welding electrode of smaller cross-section than said opening, gas conduit means joined with said jacket and communicating with said interspace for supplying it with protective gas to pass through said porous wall into said welding space, electrode holder means joined with said tubular structure and having an electrode guidance passage defining an electrode axis passing through said opening in a direction transverse to the axis of said tubular structure, the welding electrode when passing through said opening forming together therewith an annular gas passage, said holder means having a cavity adjacent to, and communicating with said opening, said cavity being closed to the ambient air and having an area in common with said porous wall, whereby a gas passage is formed from said opening through said cavity and said porous wall to said welding space.

8. In an arc welding device according to claim 7, said cavity being coaxially disposed relative to said opening and having a larger diameter than said opening.

9. In an arc welding device according to claim 7, said cavity having a bore through which it communicates with the ambient air.

10. An arc welding device according to claim 2, comprising two ring-shaped cover plates mounted on the axially opposite ends of said tubular structure and having respective central openings for guidance of the material to be welded.

11. An arc welding device according to claim 1, comprising a sleeve which forms a lining in said opening and extends from said porous wall to said cavity, said cavity having a bore through which it communicates with the ambient air.

12. An arc welding device for rod or tube material, comprising a tubular structure forming a welding space to be coaxially traversed by the material to be welded, said tubular structure having a porous wall surrounding said welding space and defining a multitude of heteromorphous irregular gas passages, said wall having a lateral opening for the passage of a welding electrode of smaller cross-section than said opening, gas conduit means joined with said tubular structure at the exterior side of said porous wall for supplying protective gas through said porous wall to said welding space, electrode holder means joined with said tubular structure and having an electrode passage defining an electrode axis passing through said opening in a direction transverse to the axis of said tubular structure, the welding electrode when passing through said opening forming together therewith an annular gas passage, said holder means having a cavity forming a gas chamber with an area in common with said wall and communicating with said opening so as to form a gas flow path from said conduit means through said wall into said chamber and through said opening toward the welding space for cooling the electrode.

13. In an arc welding device for rod or tube material, comprising a tubular structure forming a welding space to be coaxially traversed by the material to be welded, said tubular structure having a porous gas-permeable wall completely surrounding said welding space and defining a multitude of heteromorphous promiscuously directed gas passages, said tubular structure having a gas-impermeable tubular jacket concentrically surrounding said porous wall and forming together therewith an annular interspace, said porous wall having a lateral opening for the passage of a welding electrode of smaller cross-section than said opening, gas conduit means joined with said jacket and communicating with said interspace for supplying it with protective gas to pass through said porous wall into said welding space, electrode holder means joined with said tubular structure and having an electrode guidance passage defining an electrode axis passing through said opening in a direction transverse to the axis of said tubular structure, the welding electrode when passing through said opening forming together therewith an annular gas passage, said holder means having a cavity forming a gas chamber with an area in common with said wall and communicating with said opening, said cavity being coaxially disposed relative to said opening and having a larger diameter than said opening.

14. An arc welding device for rod or tube material, comprising a tubular structure forming an interior welding space to be coaxially traversed by the material to be welded, said tubular structure having an outer enclosure and a porous wall completely surrounding said welding space and defining a multitude of heteromorphous irregular gas passages, said wall having a lateral opening for the passage of a welding electrode, gas conduit means joined with the enclosure of said tubular structure at the exterior side of said porous wall for supplying protective gas through said porous wall to said welding space, electrode holder means joined with said tubular structure and having an electrode passage defining an electrode axis passing through said opening in a direction transverse to the axis of said tubular structure, the welding electrode when passing through said opening forming together therewith an annular gas passage, said holder means having a cavity forming a gas chamber adjacent to and communicating with said opening so as to form a gas flow path from said conduit means through said opening and said chamber for cooling the electrode.

References Cited in the file of this patent
UNITED STATES PATENTS

| | | |
|---|---|---|
| 2,053,417 | Brace | Sept. 8, 1936 |
| 2,918,563 | Ternisien et al. | Dec. 22, 1959 |
| 2,977,457 | Houldcroft et al. | Mar. 28, 1961 |